(12) United States Patent
Kanoh et al.

(10) Patent No.: US 7,365,479 B2
(45) Date of Patent: Apr. 29, 2008

(54) DISPLAY DEVICE, PLASMA DISPLAY DEVICE, AND OPTICAL FILTER

(75) Inventors: Tadahiko Kanoh, Izumi (JP); Takashi Furutani, Izumi (JP)

(73) Assignee: Pioneer Plasma Display Corporation, Kagoshima Prefecture (JP)

( * ) Notice: Subject to any disclaimer, the term of this patent is extended or adjusted under 35 U.S.C. 154(b) by 375 days.

(21) Appl. No.: 11/130,405

(22) Filed: May 17, 2005

(65) Prior Publication Data

US 2005/0258727 A1 Nov. 24, 2005

(30) Foreign Application Priority Data

May 18, 2004 (JP) .............................. 2004-147889

(51) Int. Cl.
*H01J 5/16* (2006.01)
(52) U.S. Cl. ..................... 313/112; 313/466; 313/479
(58) Field of Classification Search ................ 313/466, 313/474, 479, 112
See application file for complete search history.

(56) References Cited

U.S. PATENT DOCUMENTS 3,790,937 A * 2/1974 Munroe ................. 340/815.56
6,066,917 A * 5/2000 Funada ....................... 313/587

FOREIGN PATENT DOCUMENTS

JP 2000-105541 A 4/2000
JP 2003-157017 A 5/2003

* cited by examiner

*Primary Examiner*—Vip Patel
(74) *Attorney, Agent, or Firm*—Sughrue Mion, PLLC

(57) ABSTRACT

The present invention provides an optical filter for a display device capable to improve the bright-location contrast, and a display device in particular a plasma display device incorporating the optical filter. In a transmittance spectrum of the optical filter, a transmittance in a region having a wavelength range of 430 nm to 445 nm, a transmittance in a region having a wavelength range of 535 to 560 nm, and a transmittance in a region having a wavelength range of 605 to 630 nm are set to 80% or less of the maximum transmittance over the entire visible wavelength region.

20 Claims, 6 Drawing Sheets

DISPLAY DEVICE, PLASMA DISPLAY DEVICE, AND OPTICAL FILTER

BACKGROUND OF THE INVENTION

1. Field of the Invention

This invention relates to a display device and in particular to a plasma display device used for displaying information such as a television receiver and a computer display, and to an optical filter for a display device incorporated into the display device.

2. Description of the Related Art

In general, an optical filter of which optical transmittance is adjusted to a prescribed value is incorporated into a display device so as to improve a contrast in bright locations (hereinafter referred to as a bright-location contrast). FIG. 6 shows the function of the optical filter. As shown in FIG. 6, in the display device, the optical filter 11 is provided on the front side, i.e., the display-surface side, of a display panel 10. Light 12 emitted from the display panel 10 passes through the optical filter 11 and exits to the exterior of the display device. On the other hand, a part of the ambient light 13 incident to the optical filter 11 of the display device from the external environment is reflected by the front surface of the optical filter 11, and then becomes a reflected light 14, and the rest of the ambient light 13 passes through the optical filter 11, reflects off the front surface of the display panel 10, passes through the optical filter 11 again, and then becomes a reflected light 15.

As a result, the reflected lights 14 and 15 are mixed with the light 12 emitted from the display panel 10, so that the bright-location contrast of the display device decreases. In actuality, the reflected light 14 reflected at the front surface of the optical filter 11 is extremely weak as compared with the reflected light 15 reflected at the front surface of the display panel 10, so that the bright-location contrast of the display device is greatly affected by the transmittance of the optical filter 11. Assuming the transmittance of the optical filter 11 as t, an intensity of the light 12 after passing through the optical filter 11 is expressed as an intensity of the light 12 emitted from the display panel 10 multiplied by t, whereas the intensity of the reflected light 15 which has passed through the optical filter 11 twice is expressed as an intensity of the ambient light 13 multiplied by $t^2$. Hence if the reflected light 14 is neglected, the bright-location contrast, which is defined by an intensity of light emitted from display panel divided by an intensity of reflected light from outside, becomes $t/t^2=1/t$. For example, if the transmittance t of the optical filter 11 is 60%, then the bright-location contrast becomes $1/t=1/0.6\approx1.7$. Accordingly, provision of an optical filter 11 in the front-surface side of the display panel 10 improves the bright-location contrast.

A plasma display panel (hereafter referred to as a PDP), which is recently getting attention due to its capability to providing a large screen and flat shape, has two transparent substrates arranged parallel to each other, and a plurality of display cells provided between the two transparent substrates. The display cells are filled with a rare gas such as helium, neon and xenon. Discharge of the rare gas generates ultraviolet rays, and these ultraviolet rays excite a fluorescent material to cause light emission. Accordingly, images are displayed. However, because the discharge emission wavelength of neon exists in the visible range (in the red-orange range), there is a problem that the emission of neon deteriorates color repeatability of the plasma display.

FIG. 7 is a graph showing an example of the spectrum of a conventional optical filter in which an abscissa denotes wavelength of light and an ordinate denotes optical transmittance. In FIG. 7, the spectrum 21 shows a spectrum of a conventional optical filter. As shown in FIG. 7, the optical transmittance of this optical filter is suppressed to approximately 65% at maximum. As a result, if this optical filter is incorporated into a display device, the bright-location contrast of the display device is improved. The spectrum of this optical filter has regions where the transmittance is lower as compared with other regions, such as 21a, 21b and 21c. The region 21a is a discharge emission region of neon, the region 21b is a near-infrared region, and the region 21c is the near-ultraviolet region. Reduction of the transmittance in the region 21a allows absorbing the emission of neon, and thus the color repeatability in image displaying can be enhanced. On the other hand, reduction of the transmittance in the regions 21b and 21c allows absorbing excess light. Thus, selectively establishing the wavelength region having low transmittance enables a color filter to adjust the hues of the display device.

In Japanese Patent Kokai No. 2000-105541, pages 3 through 6, an optical filter with an object of enhancing the contrast and color repeatability of the display device is disclosed in which a ray transmittance at wavelength of 450 nm is greater than the ray transmittance at wavelength of 525 nm, and the ray transmittance at wavelength of 525 nm is greater than the ray transmittance at wavelength of 630 nm. It is also disclosed in this optical filter that the ray transmittance at wavelength of 580 nm is 60% or less. Further, in Japanese Patent Kokai No. 2003-157017, pages 3 through 5 and FIG. 4, an optical filter with an object of enhancing the bright-location contrast of the display device is disclosed which has an absorption band near 490 nm (in a region between blue and green), and the transmittance at 490 nm is lower than the transmittance of white light of the PDP.

The above-described conventional technology has the following problems. In a conventional optical filter, the transmittance in a wavelength region of the light emission of the display device is set higher than the transmittances in other wavelength regions in order to maintain high brightness of the display device. But currently, display devices are often installed in indoor environments where fluorescent lamps are often used as indoor illuminations so that the ambient light is mostly the light from the fluorescent lamps. As a result, the most outstanding factor that decreases the bright-location contrast is the reflected light from the fluorescent lamps. However, since the emission spectrum of the fluorescent lamp often has high intensity in the same region as the emission wavelength of the display device, the above-described conventional optical filters cannot sufficiently reduce the intensity of the reflected light caused by the fluorescent lamps.

SUMMARY OF THE INVENTION

The present invention has an object to provide an optical filter for display devices capable of improving the bright-location contrast, and to provide a display device in particular a plasma display device incorporating such optical filter.

According to a first aspect of the invention, there is provided a display panel and an optical filter positioned on a display surface side of the display panel. Optical transmittances of the optical filter are 80% or less of the maximum transmittance over the entire visible wavelength region in at least two wavelength regions among a first wavelength region having a wavelength range of 430 to 445 nm, a second wavelength region having a wavelength range of 535 to 560 nm, and a third wavelength region having a wavelength range of 605 to 630 nm.

In this invention, light emitted from a three-wavelength type fluorescent lamp passes through the optical filter, reflects off the display panel, and passes through the optical filter again. In this process, the intensity of the light can be effectively weakened and the bright-location contrast of the display device can be improved.

It is preferable that the optical transmittances are 80% or less of the above-described maximum value in all the first through third wavelength regions mentioned above.

In the above-described optical filter, the transmittances in the second and third wavelength regions may be 80% or less of the maximum transmittance and the transmittance in the first wavelength region may be above 80% of the maximum transmittance, and in the display panel, the emission intensity in the first wavelength region may be lower than the emission intensities in the second and third wavelength regions With this arrangement, the white balance of light emitted from the display panel can be maintained in a normal state.

Alternatively, in the above-described optical filter, the transmittances in the first and third wavelength regions may be 80% or less of the maximum transmittance and the transmittance in the second wavelength region may be above 80% of the maximum transmittance, and in the display panel, the emission intensity in the second wavelength region may be lower than the emission intensities in the first and third wavelength regions.

Alternatively, in the above-described optical filter, the transmittances in the first and second wavelength regions may be 80% or less of the maximum transmittance and the transmittance in the third wavelength region may be above 80% of the maximum transmittance, and in the display panel, the emission intensity in the third wavelength region may be lower than the emission intensities in the first and second wavelength regions.

Further, it is preferable that the above-described optical filter absorbs at least a part of neon light emissions, at least a part of ultraviolet rays, and at least a part of infrared rays. With this arrangement, the optical filter can absorb excess light and the display quality of the display device can be improved.

According to a second aspect of the invention, there is provided a plasma display panel and an optical filter positioned on a display surface side of the plasma display panel. Optical transmittances of the optical filter are 80% or less of the maximum transmittance over the entire visible wavelength region in at least two wavelength regions among a first wavelength region having a wavelength range of 430 to 445 nm, a second wavelength region having a wavelength range of 535 to 560 nm, and a third wavelength region having a wavelength range of 605 to 630 nm.

According to a third aspect of the present invention, there is provided an optical filter for a display device. Optical transmittances of the optical filter are 80% or less of the maximum transmittance over the entire visible wavelength region in at least two wavelength regions among a first wavelength region having a wavelength range of 430 to 445 nm, a second wavelength region having a wavelength range of 535 to 560 nm, and a third wavelength region having a wavelength range of 605 to 630 nm.

According to this invention, provision of an optical filter, of which optical transmittances are 80% or less of the maximum transmittance over the entire visible wavelength region in at least two wavelength regions among a first wavelength region having a wavelength range of 430 to 445 nm, a second wavelength region having a wavelength range of 535 to 560 nm, and a third wavelength region having a wavelength range of 605 to 630 nm, improves a bright-location contrast of a display device.

DETAILED DESCRIPTION OF THE INVENTION

Embodiments of the present invention will be hereinafter described with reference to accompanying drawings. Firstly, a first embodiment of the present invention will be described. The display device of this embodiment is a plasma display device used, for example, as a television receiver.

Figure 1:
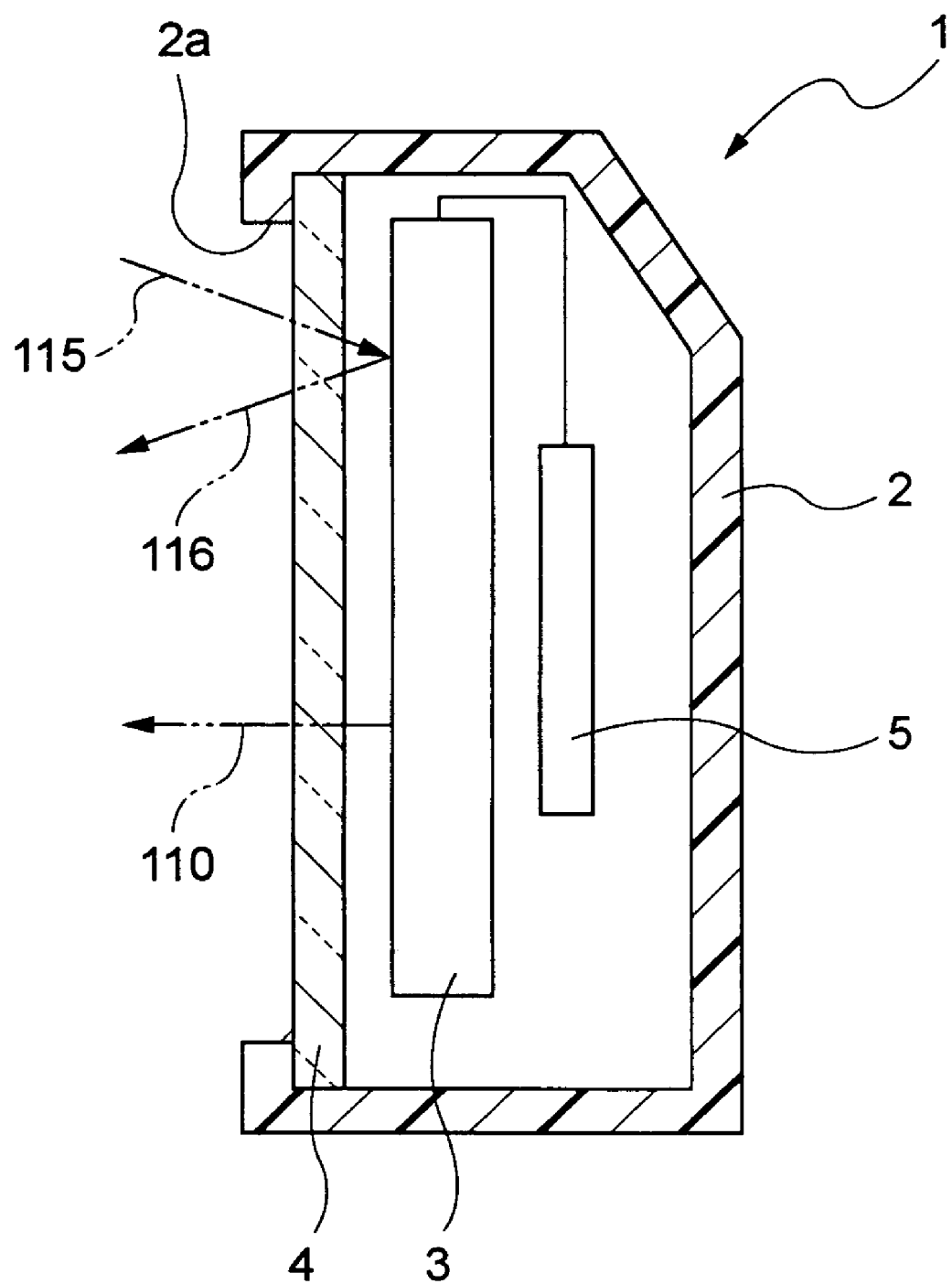
FIG. 1 is a schematic cross-sectional view showing a plasma display device of a first aspect of the present invention.

As shown in FIG. 1, a plasma display device 1 of this embodiment has a housing 2, and an aperture 2a formed in a front face of the housing 2. Within the housing 2, a PDP 3 is provided as a display panel. The PDP 3 is supported by an appropriate support member (not shown) so that a display surface thereof faces the aperture 2a of the housing 2. An optical filter 4 for the display device is installed on the housing 2 so as to cover the aperture 2a. With this arrangement, the optical filter 4 is positioned on the front side of the PDP 3, that is, on the display surface side. On a rear side of the PDP 3, a driving circuit 5 connected to the PDP 3 is provided so as to drive the PDP 3.

Figure 2:
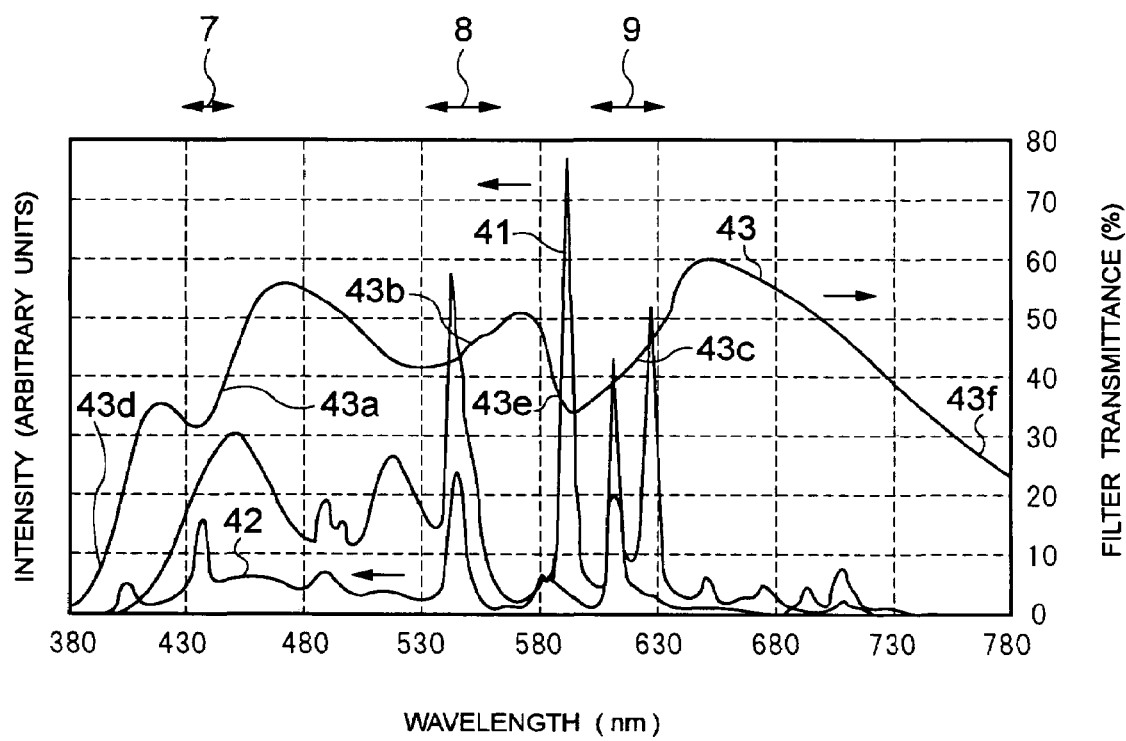
FIG. 2 is a graph showing a spectrum of an optical filter of this embodiment and emission spectra of a fluorescent lamp and a PDP where an abscissa denotes an optical wavelength and an ordinate denotes an optical transmittance and intensity.

Referring to FIG. 2, there is shown a region 7 denoting the wavelength region having a wavelength range of 430 to 445 nm, a region 8 denoting the wavelength region having a wavelength range of 535 to 560 nm, and a region 9 denoting the wavelength region having a wavelength range of 605 to 630 nm. The region 7 (430 to 445 nm) is positioned in the blue wavelength region, the region 8 (535 to 560 nm) is positioned in the green wavelength region, and the region 9 (605 to 630 nm) is positioned in the red wavelength region. A spectrum 41 represents the emission spectrum of the PDP 3 (see FIG. 1), a spectrum 42 indicates the emission spectrum of a three-wavelength type fluorescent lamp, and a spectrum 43 indicates the transmittance spectrum of the optical filter 4. Note that the emission intensity of the PDP 3 and the emission intensity of the three-wavelength type fluorescent lamp are in arbitrary units.

The optical filter 4 is formed by a plate member made from a transparent material such as glass or a transparent resin, and a compound absorbing light in a specified wavelength range is added to the plate member. For example, the optical filter may be formed by the transparent resin plate including an organic compound.

In the transmittance spectrum 43 of the optical filter 4, the transmittance in the region 43a having a wavelength range of 430 to 445 nm, the transmittance in the region 43b having a wavelength range of 535 to 560 nm, and the transmittance in the region 43c having a wavelength range of 605 to 630 nm are all 80% or less of the maximum value of the transmittance (maximum transmittance) in the entire wavelength region of the visible light (for example, in a range of 400 to 760 nm). Specifically, the maximum transmittance is 60% which exists at the wavelength of 653 nm, and the transmittances in the regions 43a, 43b, 43c have 80% or less of the maximum transmittance, i.e., 48% or less. Note that a minimum value of the transmittance does not necessarily exist in the regions 43a, 43b, 43c in order to set the transmittance to a low level.

By establishing the transmittances in the regions 43a, 43b, 43c to be 80% or less of the maximum transmittance in the visible wavelength region, reflected light caused by the light of the three-wavelength type fluorescent lamp can be effectively suppressed, and the bright-location contrast of the display device can be improved. On the other hand, if the transmittances in the regions 43a, 43b, 43c are higher than 80% of the maximum transmittance in the visible wavelength region, the effect of suppressing the reflected light becomes inadequate. When there is a need to further improve the bright-location contrast, the ratios of the transmittances in the regions 43a, 43b, 43c to the maximum transmittance may be set to prescribed values of 80% or less in accordance with the target bright-location contrast.

In the transmittance spectrum 43 of the optical filter 4, the transmittances of the near-ultraviolet region 43d, neon emission region 43e, and near-infrared region 43f are also set to be lower than the transmittances of other regions. With this arrangement, a part of the excess light, i.e., a part of the neon emission light, a part of the near-infrared rays, and a part of the near-ultraviolet rays are absorbed by the optical filter 4.

Figure 3:
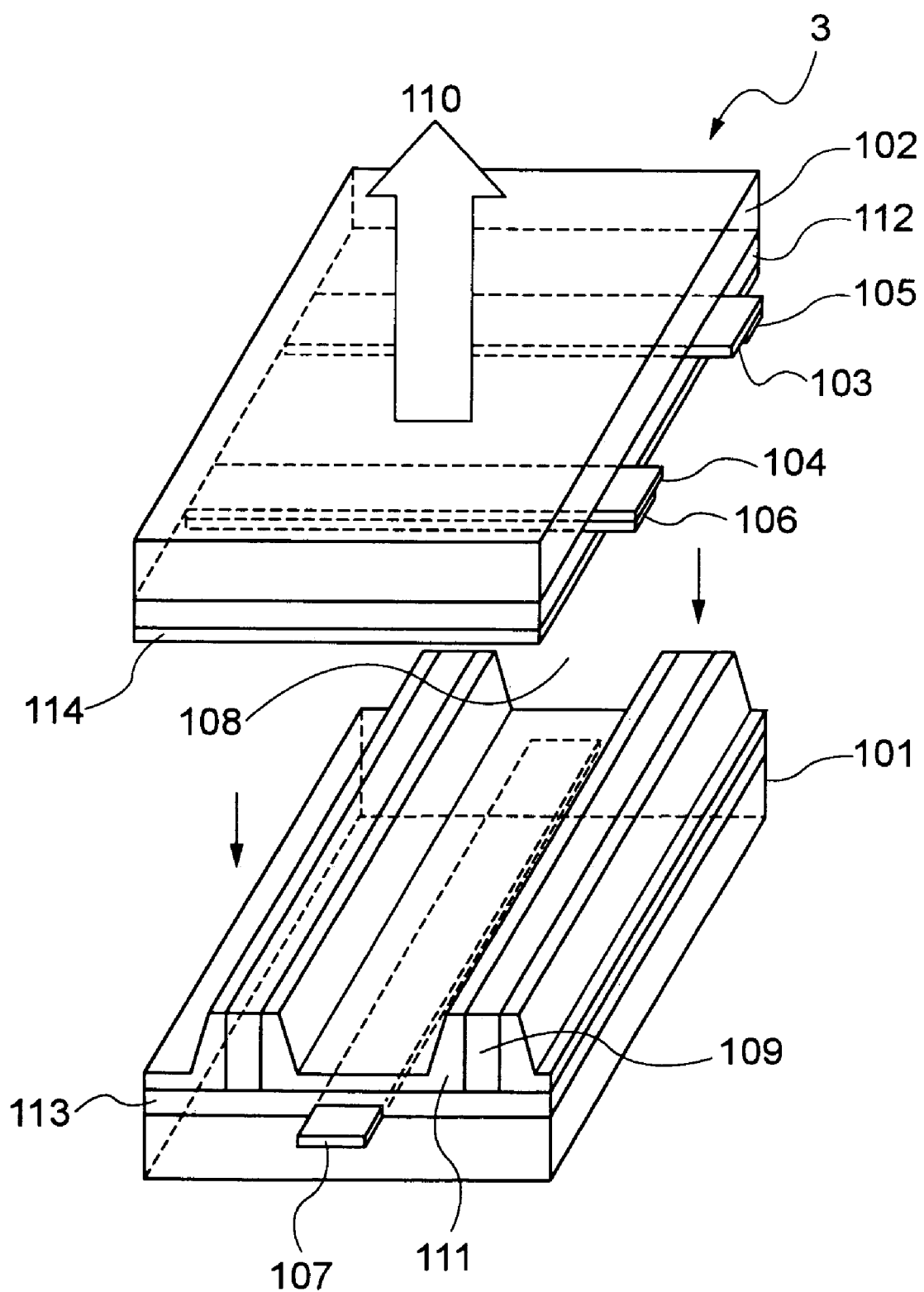
FIG. 3 is an exploded perspective view showing a single display cell of the PDP of FIG. 1.

As shown in FIG. 3, two insulating substrates 101 and 102 made of, for example, glass are provided in the PDP 3. The insulating substrate 101 is the rear-surface substrate, and the insulating substrate 102 is the front-surface substrate. Transparent scanning electrodes 103 and transparent sustain electrodes 104 are provided on a surface of the insulating substrate 102 facing the insulating substrate 101. The scanning electrodes 103 and the sustain electrodes 104 extend in a horizontal direction of the panel (lateral direction). In addition, trace electrodes 105 and 106 are positioned so as to overlap with the scanning electrodes 103 and sustain electrodes 104, respectively. The trace electrodes 105 and 106 are made of, for example, metal, and are provided in order to reduce electrode resistances between the electrodes and the external driving device. Further, a dielectric layer 112 covering the scanning electrodes 103 and sustain electrodes 104, and a protective layer made of magnesium oxide or the like to protect the dielectric layer 112 from discharge are also provided.

On a surface of the insulating substrate 101 facing the insulating substrate 102 data electrodes 107 are provided which are perpendicular to the scanning electrodes 103 and sustain electrodes 104 seen from a direction normal to the surface of the insulating substrate 101, i.e., seen from a plane view. Hence the data electrodes 107 extend in a direction perpendicular to the panel (vertical direction). A dielectric layer 113 covering the data electrodes 107 is provided, and on the dielectric layer 113, partition walls 109 for dividing the display cells in the horizontal direction are provided. A fluorescent material layer 111 which converts the ultraviolet rays generated by discharge of the discharge gas into visible rays 110 is formed on the side faces of the partition walls 109 and on the surface of the dielectric layer 113. Discharge gas spaces 108 are secured by the partition walls 109 in the space between the insulating substrates 101 and 102. The discharge gas spaces 108 are filled with a discharge gas such as helium, neon or xenon, or a mixture thereof.

Figure 4:
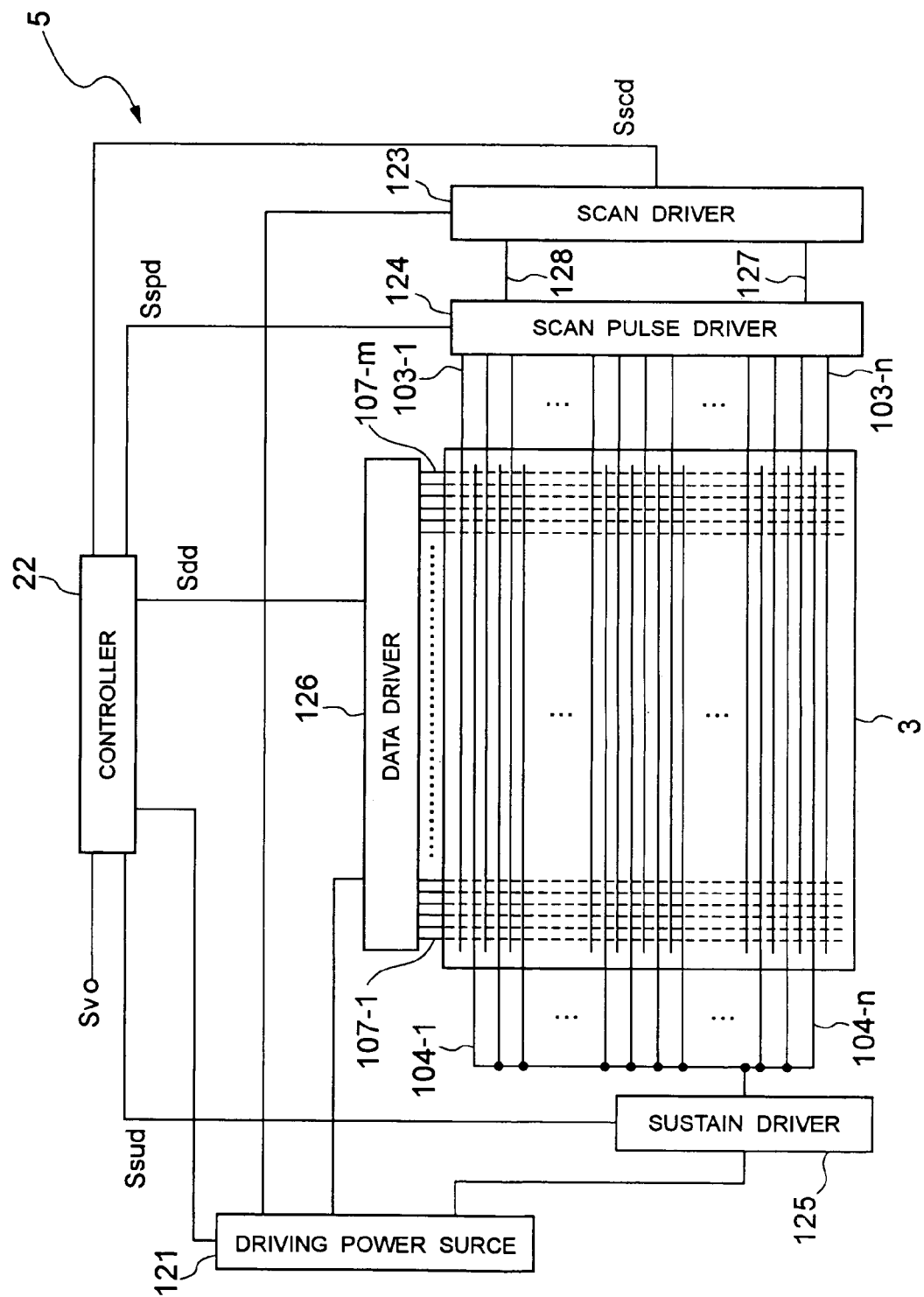
FIG. 4 is a block diagram showing the driving circuit of FIG. 1.

As shown in FIG. 4, the PDP 3 includes n scanning electrodes 103 (where n is a natural number) (103-1 through 103-n) and n sustain electrodes 104 (104-1 through 104-n) both extending in the row direction (horizontal direction) so that each of the scanning electrodes 103 and each of the sustain electrodes 104 are alternately arranged with a prescribed distance therebetween. Further, the PDP 3 includes m data electrodes 107 (where m is a natural number) (107-1 through 107-m) extending in the column direction (vertical direction) so as to orthogonally intersect with the scanning electrodes 103 and sustain electrodes 104 seen from a plane view. Display cells (discharge cells) are arranged in a matrix pattern so that each of the display cells includes a nearest contact point between the scanning electrode and the data electrode and a nearest contact point between the sustain electrode and the data electrode. Accordingly, n×m display cells are provided in the PDP 3.

The driving circuit 5 includes a driving power source 121, controller 122, scan driver 123, scan pulse driver 124, sustain driver 125, and data driver 126. The driving power source 121 generates and outputs the voltages necessary for operation of the controller 122, scan driver 123, scan pulse driver 124, sustain driver 125, and data driver 126. Based on an image signal Sv supplied from external equipment, the controller 122 generates a scan driver control signal Sscd and outputs it to the scan driver 123, generates a scan pulse driver control signal Sspd and outputs it to the scan pulse driver 124, generates a sustain driver control signal Ssud and outputs it to the sustain driver 125, and generates a data driver control signal Sdd and outputs it to the data driver 126.

The scan driver 123 selects voltages at two levels from a plurality of voltage levels supplied from the driving power source 121, based on the scan driver control signal Sscd supplied from the controller 122, and supplies these voltages to the scan pulse driver 124 via a positive line 127 and a negative line 128. The scan pulse driver 124 applies the voltages supplied from the scan driver 123 to scan electrodes 103 based on the scan pulse driver control signal Sspd supplied from the controller 122. The sustain driver 125 selects one voltage level from a plurality of voltage levels supplied from the driving power source 121 based on the sustain driver control signal Ssud supplied from the controller 122, and applies this voltage to the sustain electrodes 104. The data driver 126 selects one voltage level from a plurality of voltage levels supplied from the driving power source 121 based on the data driver control signal Sdd supplied from the controller 122, and applies this voltage to the data electrodes 107.

The operation of the plasma display device of this embodiment having a configuration described above will be now described. In this embodiment, the plasma display device 1 is assumed to be operated in a room illuminated by a three-wavelength type fluorescent lamp. As shown in FIG. 4, the driving power source 121 generates voltages at a plurality of levels, and supplies the voltages to the controller 122, scan driver 123, scan pulse driver 124, sustain driver 125, and data driver 126. Based on the image signal Sv supplied from external equipment, the controller 122 generates the scan driver control signal Sscd and outputs it to the scan driver 123, generates the scan pulse driver control signal Sspd and outputs it to the scan pulse driver 124, generates the sustain driver control signal Ssud and outputs it to the sustain driver 125, and generates the data driver control signal Sdd and outputs it to the data driver 126.

As a result, the scan driver 123 selects two voltage levels from the plurality of voltage levels supplied from the driving power source 121 based on the scan driver control signal Sscd, and supplies these voltages to the scan pulse driver 124 via the positive line 127 and negative line 128. The scan pulse driver 124 applies the voltages supplied from the scan driver 123 to the scan electrodes 103 based on the scan pulse driver control signal Sspd. The sustain driver 125 selects one voltage level from the plurality of voltage levels supplied from the driving power source 121 based on the sustain driver control signal Ssud, and applies this voltage to the sustain electrodes 104. The data driver 126 selects one voltage level from the plurality of voltage levels supplied from the driving power source 121 based on the data driver control signal Sdd, and applies this voltage to the data electrodes 107.

At this time, the controller 122 repeats processing of fields, each of which displays a single image on the PDP 3. Accordingly, a moving image is displayed. Within each field, a plurality of subfields are sequentially processed. Within one subfield, four periods consisting of a priming period, addressing period, sustain period and charge erasure period are sequentially processed. In the priming period, all display cells are caused to emit light, and then activation and unification of the charge state are carried out in all display cells for initialization. In the addressing period, write discharge is caused for forming wall charge in the display cells for which sustained discharge is to be caused during the sustain period after the addressing period. In the sustain period, sustained discharge is caused in the display cells in which the wall charge has been formed during the addressing period. In the charge erasure period, the wall charge in the display cells which have been emitted during the sustain interval is erased.

As shown in FIG. 3, through the above-described operation, discharge occurs across the scan electrode 103 and sustain electrode 104, and the ultraviolet rays generated by this discharge excite the fluorescent material layer 111 in each display cell. Consequently, visible light 110 is emitted from the fluorescent material layer 111. This visible light 110 passes through the protective layer 114, dielectric layer 112 and insulating substrate 102 of the PDP 3 and is emitted from the front surface of the PDP 3. Then the visible light 110 passes through the optical filter 4 (see FIG. 1) and exits to the outside of the display device 1.

At this time, as shown in FIG. 1, ambient light 115 is incident to the aperture 2a of the display device 1 from the external environment of the display device 1. The ambient light 115 is mainly light emitted from a three-wavelength type fluorescent lamp (not shown). A part of the ambient light 115 passes through the optical filter 4, reflects off the front surface of the PDP 3, passes through the optical filter 4 again to become reflected light 116, and exits to the outside mixedly with the visible light 110. The light reflected by the optical filter 4 out of the ambient light 115 is extremely weak as compared with the reflected light 116, and therefore the light reflected by the optical filter 4 can be neglected. Hence the viewer perceives a mixture of the visible light 110 representing image information and the reflected light 116 from the ambient light 115.

As shown in FIG. 2, the emission spectrum of the three-wavelength type fluorescent lamp generally has a feature shown by the spectrum 42, in which sharp peaks are exhibited in the region 7 (430 to 445 nm, the blue region), region 8 (535 to 560 nm, the green region), and region 9 (605 to 630 nm, the red region). In the transmittance spectrum 43 of the optical filter 4, the transmittances in the regions 7, 8 and 9 are 80% or less of the maximum value of the transmittance (the maximum transmittance) in the entire wavelength region of the visible light. Consequently, when ambient light 115 passes through the optical filter twice, the sharp peaks in the regions 7, 8 and 9 are selectively absorbed, and the intensities in such regions are decreased. As a result, the intensity of the reflected light 116 is low over the entire wavelength range.

On the other hand, there exist peaks in the regions 7, 8 and 9 in the spectrum 41 of visible light 110 emitted from the PDP 3 as well, but the effect of attenuation of the visible light 110 by the optical filter 4 is smaller than the effect of attenuation of ambient light 115 by the optical filter 4 because the visible light 110 passes through the optical filter 4 only once. Consequently, the bright-location contrast of the plasma display device 1 is higher than that of the conventional plasma display device.

As described above, according to the first embodiment, establishment of the transmittance spectrum of the optical filter 4 as described above can effectively weaken the reflected light from the fluorescent lamp used as the ambient illumination, and can improve the bright-location contrast of the plasma display device 1. Moreover, absorption of a part of the neon light emission, a part of near-infrared rays, and a part of near-ultraviolet rays by the optical filter 4 can further improve the display quality of the plasma display device 1.

Figure 5:
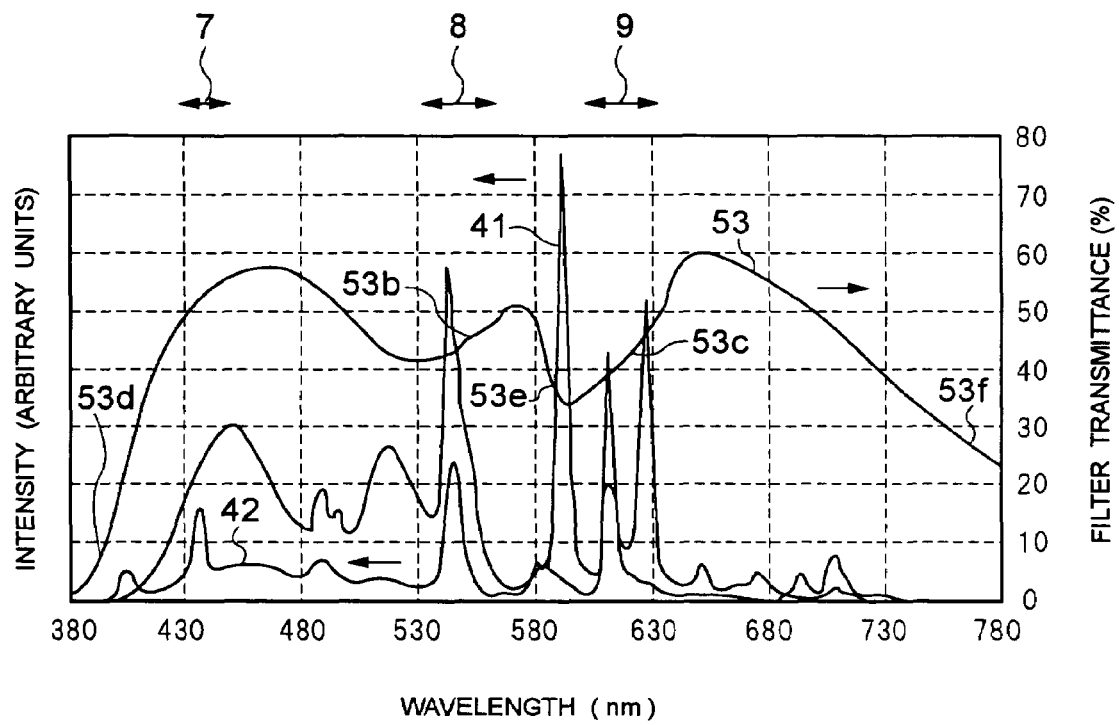
FIG. 5 is a graph showing a spectrum of an optical filter of a second embodiment and emission spectra of a fluorescent lamp and a PDP where an abscissa denotes an optical wavelength and an ordinates denotes an optical transmittance and intensity.
Figure 6:
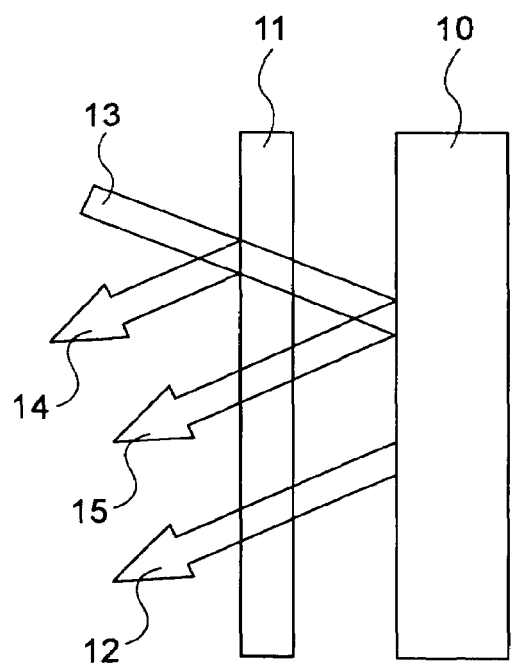
FIG. 6 shows function of an optical filter.
Figure 7:
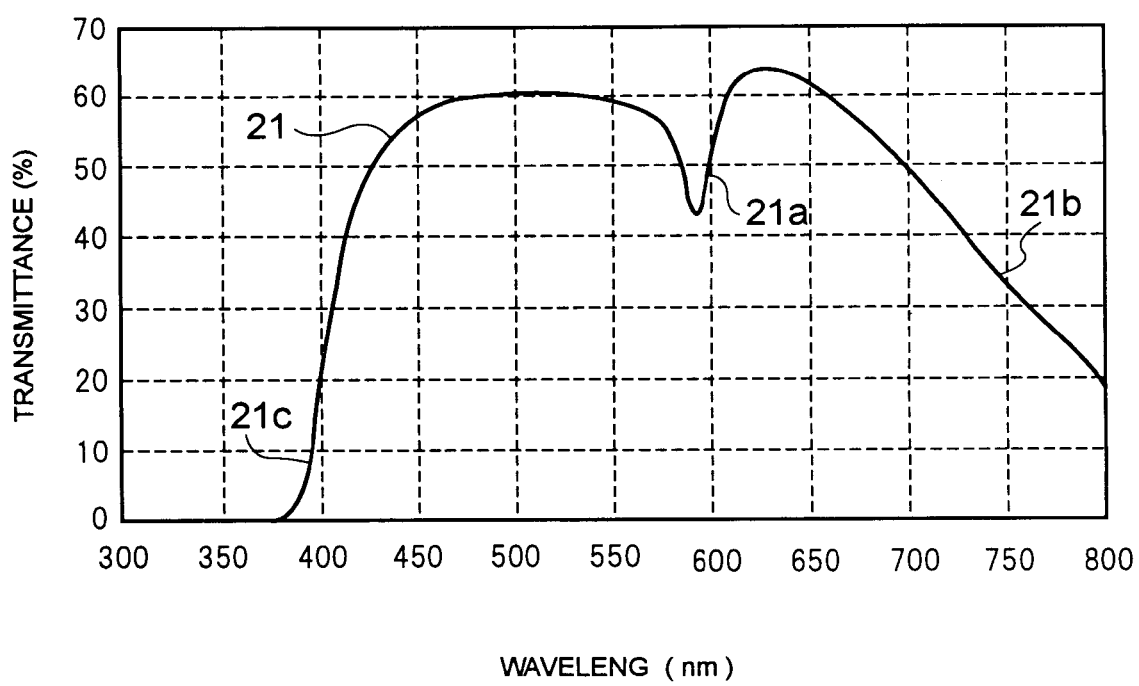
FIG. 7 is a graph showing one example of a spectrum of a conventional optical filter where an abscissa denotes an optical wavelength and an ordinate denotes an optical transmittance.

A second embodiment of the present invention will be hereinafter described. FIG. 5 is a graph showing a spectrum of an optical filter of this embodiment and emission spectra of a fluorescent lamp and a PDP where an abscissa denotes a light wavelength and an ordinate denotes an optical transmittance and intensity. In this embodiment, the transmittance spectrum of the optical filter and the PDP emission spectrum are different from those of the above-described first embodiment.

As shown in FIG. 5, the positions of the regions 7 through 9 are the same as those of FIG. 2. Specifically, a region 7 denotes the region having a wavelength range of 430 to 445 nm, a region 8 denotes the region having a wavelength range of 535 to 560 nm, and a region 9 denotes the region having a wavelength range of 605 to 630 nm. A spectrum 53 represents the transmittance spectrum of the optical filter of this embodiment. Note that, similar to FIG. 2, the spectrum 41 represents the emission spectrum of the PDP and the spectrum 42 represents the emission spectrum of a three-wavelength type fluorescent lamp. The optical filter of this embodiment has a plate shape made from a transparent material such as glass or a transparent resin, to which a compound absorbing light in a specific wavelength is added. For example, the optical filter may be formed by a transparent resin plate including an organic compound.

In the transmittance spectrum 53 of the optical filter of this embodiment, the transmittance in the region 53b having a wavelength range of 535 to 560 nm and the transmittance in the region 53c having a wavelength range of 605 to 630 nm are 80% or less of the maximum value of the transmittance (the maximum transmittance) over the entire wavelength range of the visible light (for example, in a range of 400 to 760 nm). Specifically, the transmittance in these regions is 48% or less, that is, 80% or less of the maximum transmittance of 60% that exists at 653 nm. Note that the transmittance in the region having a wavelength range of 430 to 445 nm is higher than 80% of the maximum transmittance. Also, a minimum value of the transmittance does not necessarily exist in the regions 53b or 53c in order to set the transmittance to a low level. Moreover, in the emission spectrum 53 of the optical filter, the transmittances in the near-ultraviolet region 53d, in the neon emission wavelength region 53e, and in the near-infrared region 53f are also set low as compared with other regions, so that excess light is absorbed.

In this embodiment, the transmittances of the optical filter in the region 8 (535 to 560 nm) positioned in the green wavelength region and in the region 9 (605 to 630 nm) positioned in the red wavelength region are set to be 80% or less of the maximum transmittance, whereas the transmittance of the optical filter in the region 7 (430 to 445 nm) positioned in the blue wavelength region is set to be higher than 80% of the maximum transmittance. Consequently, if the emission spectrum of the PDP remains unchanged from the emission spectrum of a normal PDP as indicated by the spectrum 41 in FIG. 5, the white balance of light passing through the optical filter is disrupted. Hence it is necessary to adjust the brightness ratio among blue, green and red of the plasma display device by adjusting the emission spectrum of the PDP in accordance with the transmittance spectrum of the optical filter. In this embodiment, through an improvement of, for example, the fluorescent material or the driving method in the PDP, the emission intensity in the region 7 is made lower than the emission intensities in the regions 8 and 9. The configurations of this embodiment other than that described above are similar to those of the above-described first embodiment.

According to this embodiment, in the display screen of a plasma display device, establishment of the transmittance spectrum of the optical filter as described above can effectively weaken the reflected light due to the ambient light from the fluorescent lamp used for the environment illumination. As a result, the bright-location contrast of the plasma display device can be improved.

Further, according to this embodiment, emission brightness ratio among blue, green and red of the PDP, i.e., the emission spectrum, are adjusted so as to compensate for the transmittance spectrum of the optical filter. Hence the white balance of light emitted from the PDP and passing through the optical filter is maintained as normal. Other functions and effects of this embodiment other than those described above are similar to those of the above-described first embodiment.

Note that the above-described second embodiment has been described based on such an example that the transmittances of the optical filter are set to be low in the region 8 positioned in the green wavelength region (535 to 560 nm) and in the region 9 positioned in the red wavelength region (605 to 630 nm), but the present invention is not limited thereto. Alternatively, the transmittances in the region 7 positioned in the blue wavelength region (430 to 445 nm) and in the region 8 positioned in the green wavelength region (535 to 560 nm) may be set to 80% or less of the maximum transmittance, whereas the transmittance in the region 9 positioned in the red wavelength region (605 to 630 nm) may be set above 80% of the maximum transmittance so as to lower the emission intensity in the region 9 than the emission intensities in the regions 7 and 8 of the PDP.

Alternatively, the transmittances in the region 7 positioned in the blue wavelength region (430 to 445 nm) and in the region 9 positioned in the red wavelength region (605 to 630 nm) may be set to 80% or less of the maximum transmittance, whereas the transmittance in the region 8 positioned in the green wavelength region (535 to 560 nm) may be set above 80% of the maximum transmittance so as to lower the emission intensity in the region 8 than the emission intensities in the regions 7 and 9 of the PDP.

On the other hand, if the transmittance of the optical filter in only one region among the regions 7 through 9 is set to 80% or less of the maximum transmittance to attenuate the reflected light, the white balance of the reflected light would be disrupted, which may bring uncomfortable feeling to the viewer. Hence it is necessary that the transmittances are set low in at least two regions among the regions 7 through 9.

Further, the above-described first and second embodiments have been described based on examples in which a plate-shaped optical filter is mounted on the housing of the plasma display device, but the present invention is not limited to such a configuration. Alternatively, the optical filter may have a film shape, and the optical filter may be applied to the front substrate of the PDP for use.

Further, the above-described first and second embodiments have been described based on a plasma display device using a PDP as the display panel, but the present invention is not limited to such a configuration. Alternatively, the present invention may be applied to any display device which will be used in a room illuminated by a fluorescent lamp, such as a liquid crystal display device, CRT (Cathode-Ray Tube) display device, organic EL display device.

This invention can be suitably employed in display devices which may be used in a room illuminated by a fluorescent lamp.

This application is based on a Japanese Patent Application No. 2004-147889 which is herein incorporated by reference.

What is claimed is:

1. A display device having a display panel and a single optical filter positioned on a display surface side of the display panel, wherein optical transmittances of the single optical filter are 80% or less of the maximum transmittance over the entire visible wavelength region in at least two wavelength regions among a first wavelength region having a wavelength range of 430 to 445 nm, a second wavelength region having a wavelength range of 535 to 560 nm, and a third wavelength region having a wavelength range of 605 to 630 nm.

2. The display device according to claim 1, wherein the maximum transmittance exists in a wavelength region other than the first through third wavelength regions.

3. The display device according to claim 2, wherein the optical transmittances are 80% or less of the maximum transmittance in all the first though third wavelength regions.

4. The display device according to claim 1, wherein the transmittances of the optical filter in the second and third wavelength regions are 80% or less of the maximum transmittance and the transmittance in the first wavelength region is above 80% of the maximum transmittance, and in the display panel, the emission intensity in the first wavelength region is lower than the emission intensities in the second and third wavelength regions.

5. The display device according to claim 1, wherein the transmittances of the optical filter in the first and third wavelength regions are 80% or less of the maximum transmittance and the transmittance in the second wavelength region is above 80% of the maximum transmittance, and in the display panel, the emission intensity in the second wavelength region is lower than the emission intensities in the first and third wavelength regions.

6. The display device according to claim 1, wherein the transmittances of the optical filter in the first and second wavelength regions are 80% or less of the maximum transmittance and the transmittance in the third wavelength region is above 80% of the maximum transmittance, and in the display panel, the emission intensity in the third wavelength region is lower than the emission intensities in the first and second wavelength regions.

7. The display device according to claim 1, wherein the optical filter absorbs at least a part of neon light emissions, at least a part of near-ultraviolet rays, and at least a part of near-infrared rays.

8. The display device according to claim 1, wherein the display panel is a plasma display panel.

9. A plasma display device having a plasma display panel and a single optical filter positioned on a display surface side of the plasma display panel, wherein optical transmittances of the single optical filter are 80% or less of the maximum transmittance over the entire visible wavelength region in at least two wavelength regions among a first wavelength region having a wavelength range of 430 to 445 nm, a second wavelength region having a wavelength range of 535 to 560 nm, and a third wavelength region having a wavelength range of 605 to 630 mm.

10. The plasma display device according to claim 9, wherein the maximum transmittance exists in a wavelength region other than the first through third wavelength regions.

11. The plasma display device according to claim 10, wherein the optical transmittances are 80% or less of the maximum transmittance in all the first though third wavelength regions.

12. The plasma display device according to claim 9, wherein the transmittances of the optical filter in the second and third wavelength regions are 80% or less of the maximum transmittance and the transmittance in the first wavelength region is above 80% of the maximum transmittance, and in the display panel, the emission intensity in the first wavelength region is lower than the emission intensities in the second and third wavelength regions.

13. The plasma display device according to claim 9, wherein the transmittances of the optical filter in the first and third wavelength regions are 80% or less of the maximum transmittance and the transmittance in the second wavelength region is above 80% of the maximum transmittance, and in the display panel, the emission intensity in the second wavelength region is lower than the emission intensities in the first and third wavelength regions.

14. The plasma display device according to claim 9, wherein the transmittances of the optical filter in the first and second wavelength regions are 80% or less of the maximum transmittance and the transmittance in the third wavelength region is above 80% of the maximum transmittance, and in the display panel, the emission intensity in the third wavelength region is lower than the emission intensities in the first and second wavelength regions.

15. The plasma display device according to claim 9, wherein the optical filter absorbs at least a part of neon light emissions, at least a part of near-ultraviolet rays, and at least a part of near-infrared rays.

16. A single optical filter applied on a display surface side of a display device, wherein optical transmittances of said single optical filter are 80% or less of the maximum transmittance over the entire visible wavelength region in at least two wavelength regions among a first wavelength region having a wavelength range of 430 to 445 nm, a second wavelength region having a wavelength range of 535 to 560 nm, and a third wavelength region having a wavelength range of 605 to 630 nm.

17. The optical filter according to claim 16, wherein the maximum transmittance exists in a wavelength region other than the first through third wavelength regions.

18. The optical filter according to claim 17, wherein the optical transmittances are 80% or less of the maximum transmittance in all the first though third wavelength regions.

19. The optical filter according to claim 16, wherein at least a part of neon light emissions, at least a part of near-ultraviolet rays, and at least a part of near-infrared rays are absorbed.

20. The optical filter according to claim 16, wherein the optical filter is incorporated into a plasma display device.

* * * * *